United States Patent [19]

Chevance

[11] Patent Number: 4,753,124
[45] Date of Patent: Jun. 28, 1988

[54] SCREW AND NUT DEVICE FOR TAKING UP CLEARANCE

[75] Inventor: Claude Chevance, Savigny, France

[73] Assignee: Rockwell-CIM, France

[21] Appl. No.: 42,913

[22] Filed: Apr. 27, 1987

[30] Foreign Application Priority Data

Apr. 30, 1986 [FR] France .................. 86 06343

[51] Int. Cl.[4] .......... F16D 65/56; E05F 11/48; F16C 1/22
[52] U.S. Cl. .................. 74/501.5 R; 74/424.8 R; 74/127; 74/409; 74/458; 74/459; 49/352; 188/196 V; 192/111 A
[58] Field of Search .......... 74/127, 409, 458, 459, 74/501.5 R, 424.8 R; 49/352; 188/196 V; 192/111 A

[56] References Cited

U.S. PATENT DOCUMENTS

| | | | |
|---|---|---|---|
| 4,235,046 | 11/1980 | Hess et al. | 74/501.5 R X |
| 4,378,713 | 4/1983 | Haskell et al. | 74/501.5 R |
| 4,386,685 | 6/1983 | Cole et al. | 188/196 V X |
| 4,420,988 | 12/1983 | Deligny | 74/501.5 R |
| 4,621,933 | 11/1986 | Musso | 74/409 X |

FOREIGN PATENT DOCUMENTS

355390 6/1922 Fed. Rep. of Germany ... 188/196 V

Primary Examiner—Allan D. Herrmann

[57] ABSTRACT

Device comprising a screw (6) and a nut (8) subjected to an axial force which alternates in opposite directions, the thread (7) of the screw having a given helix angle and a given pressure angle which are so chosen that, in a first direction, termed reversible direction, the screw (6) is capable, under the axial thrust exerted in this direction by a spring (20), of effecting a translation and a rotation in the nut (8), and that, in a second direction, termed irreversible direction, opposed to the first direction, the screw undergoing an axial thrust in this second direction by a push-member (9), can effect neither a translation nor a rotation in the nut. This assembly may be applied to the automatic taking up of play of systems subjected to alternating longitudinal forces, such as shafts of electric motors or cable controls.

11 Claims, 9 Drawing Sheets

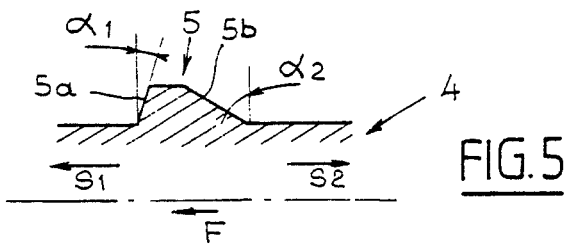
FIG. 5
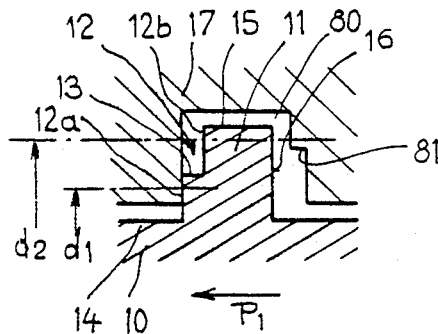
FIG. 6
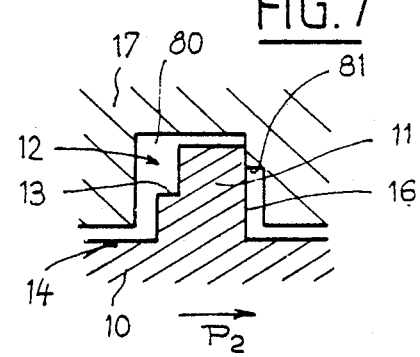
FIG. 7
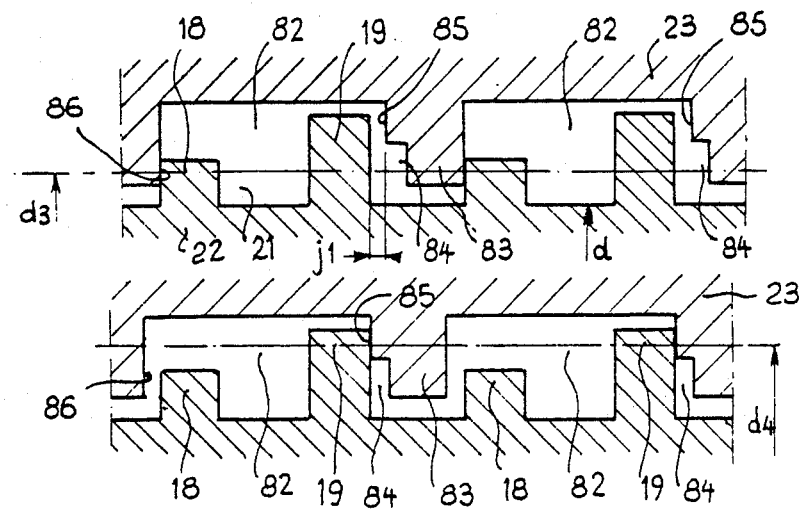
FIG. 8
FIG. 9
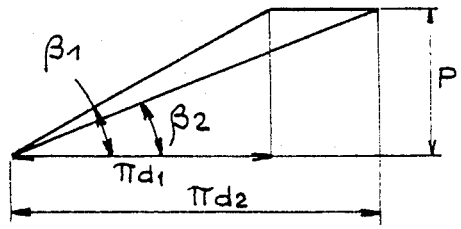
FIG. 10

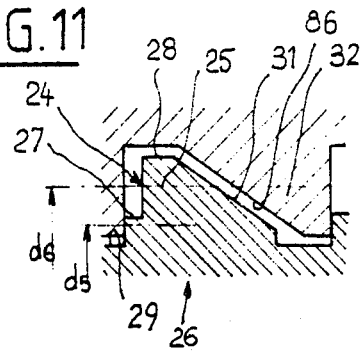
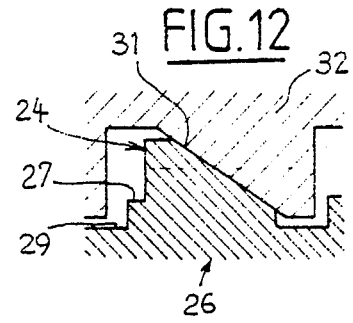
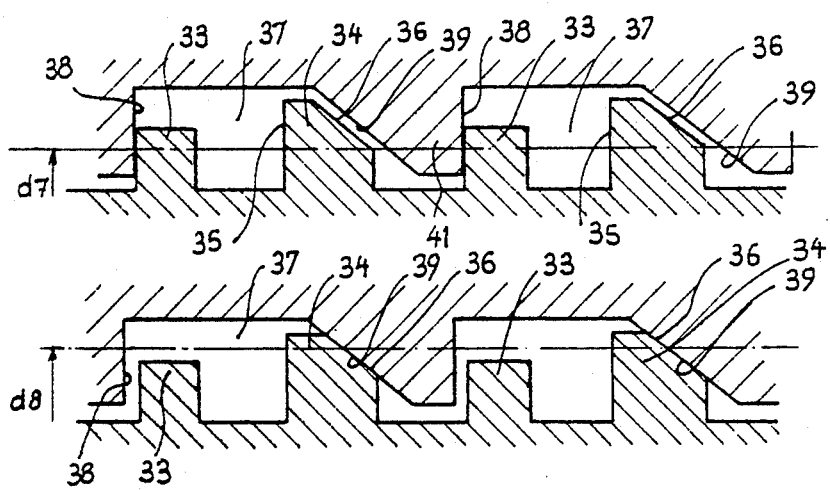
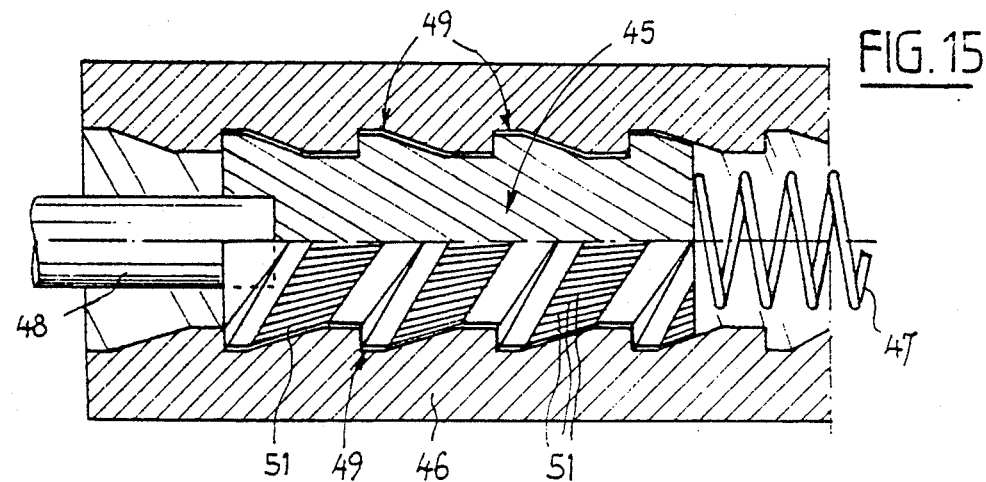

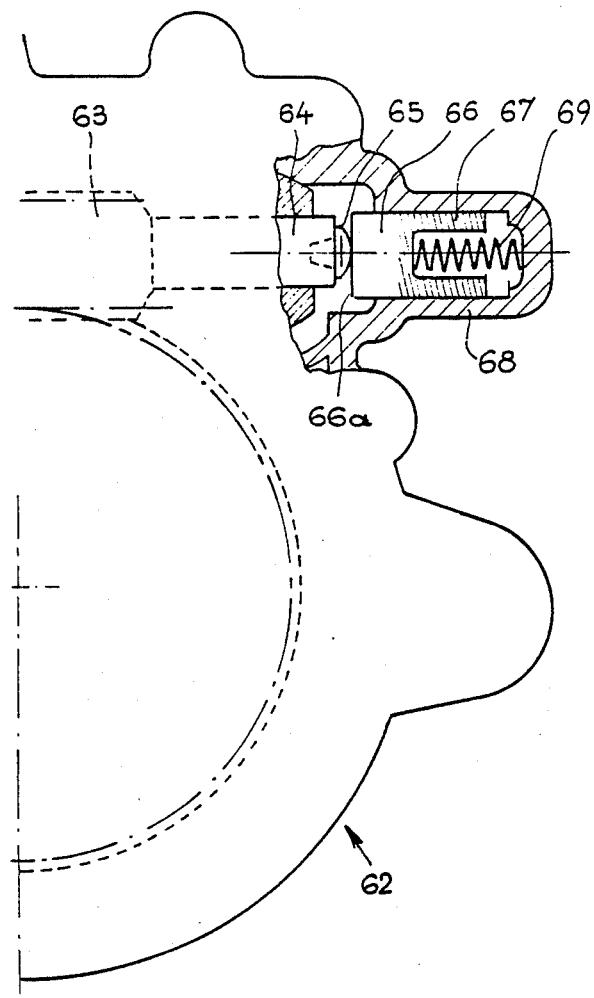
FIG.18
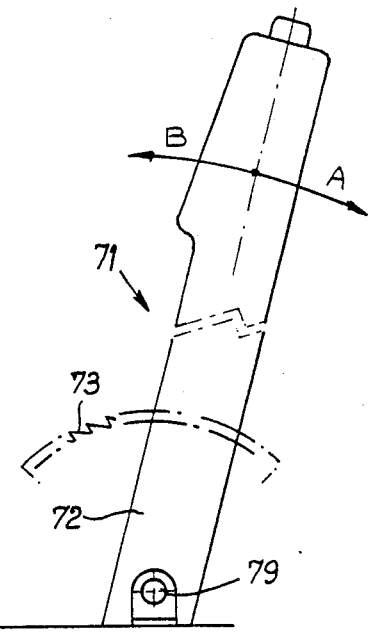
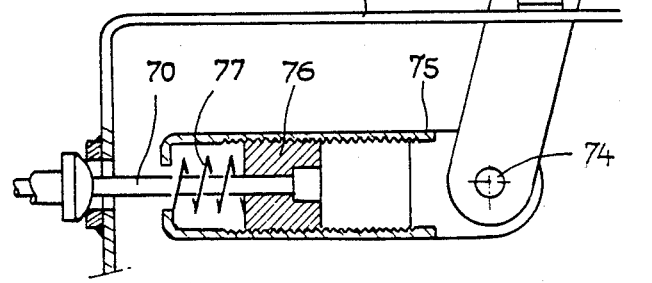
FIG.19

SCREW AND NUT DEVICE FOR TAKING UP CLEARANCE

The present invention relates to a screw and nut device for automatically taking up clearance in which the screw is associated with a push-member capable of exerting theren an axial thrust which is capable of displacing it, the thread of the screw having given helix angles and pressure angles.

It is known that operating clearances or play appear in many devices, as they operate, various means being provided for compensating these clearances as they appear. Thus, for example, it is known in window raisers employing a cable in a closed loop mounted in doors of motor vehicles, to take up the play assumed by the cable owing to the stretching of the latter as it ages, by means of a simple system employing a spring pressed tensioning device. Now, this sytem has the drawback residing in the introduction of an unpleasant play between the control crank and the window glass.

In other known devices, such as an electric motor-speed reducer unit, play occurs in the region of the shaft of the armature, and more precisely between the ends of the shaft carrying the thrust bearings at the end of the shaft and the metal members carried by the housing and which axially maintain the shaft in position. This play is due to wear of the thrust bearings in the course of operation of the motor-speed reducer unit which is proportional to the duration of operation and may exceed 0.5 mm. The axial play is regulated upon assembly by a simple steel screw brought into contact with one of the shaft end thrust bearings and it is no longer re-adjusted throughout the life of the motor. Consequently, in the course of the operation of the motor-speed reducer unit, there is a progressive production of noise.

Thus, in many known mechanical or electro-mechanical systems, either the play appears progressively in the course of operation and is not in any way taken up, or means are provided for taking up play, but which in fact do not solve the problem in a satisfactory manner.

Consequently, an object of the invention is to provide a device for automatically taking up play which is applicable not only to systems such as those mentioned before which concern the automobile industry, but also to very many other devices in other technical fields, for example bicycles, motor cycles, etc . . . .

According to the invention, the helix and pressure angles of the screw are so chosen that in a first direction, termed reversible, the screw is capable, under the effect of an axial thrust exerted in this direction by an elastically yieldable element, of effecting a helical movement in the screw each time the force exerted by the push-members disappears or is sufficiently reduced, and in a second direction, termed irreversible, opposed to the first-mentioned direction, the screw biased by the push-member exerting a force much greater than the force of the elasticlly yieldable element in this second direction cannot effect a translation or rotation in the nut.

Thus, the play or clearance which is liable to be produced between two elements associated with the screw is automatically compensated for as it appears by the unidirectional and irreversible displacement of the screw under the effect of the elastically yieldable element.

According to an embodiment of the invention in which the thread of the screw has in section two flanks inclined to a perpendicular to the axis of the screw, the pressure angles of the two flanks are different, one being preferably between zero and a low value, and the other pressure angle being of high value.

The pressure angle which is equal to 0 or is low corresponds to the reversible direction of translation and rotation of the screw and therefore permits the taking up of the play by displacement of the screw in this direction, while the screw cannot move in the opposite direction. Inded, the flank of the thread whose pressure angle is high has a value which is suitably chosen and opposes any rearward return of the screw when it is applied against the corresponding surface of the nut by the push-member.

Other features and advantages of the invention will be apparent from the following description with reference to the accompanying drawings which illustrate by way of non-limiting examples several embodiments thereof:

FIG. 1 is a partial elevational view of a screw and the associated nut;

FIG. 2 is a diagram of the development of the thread of a screw;

FIG. 3 is a diagram of the forces which are exerted on the contacting surfaces of two bodies of which one slides on the other;

FIG. 4 is a diagram explaining the angle of friction between the two contact surfaces of FIG. 3;

FIG. 5 is a diagrammatic partial axial sectional view of a screw according to a first embodiment of the invention;

FIGS. 6 and 7 are partial axial sectional views of a screw-and-nut system according to a second embodiment of the invention in two different positions;

FIGS. 8 and 9 are partial axial sectional views similar to FIGS. 6 and 7 of a third embodiment of the screw-and-nut system according to the invention;

FIG. 10 is a diagram of the development of the thread of the screw of FIGS. 6 and 7;

FIGS. 11 and 12 are partial axial sectional views of a screw-and-nut device according to a fifth embodiment of the invention;

FIG. 13 is a partial axial sectional view of an embodiment of screw and nut device of the invention in which the teeth are of unequal height, the diameter of the screw is constant and the teeth bear against the radial wall in the reversible direction;

FIG. 14 is a partial axial sectional view of an embodiment of screw and nut device of the invention in which the teeth are of unequal height, the diameter of the screw is constant and the teeth bear against the radial wall in the irreversible direction;

FIG. 15 is a half-sectional half-elevational view of a sixth embodiment of the screw-and-nut system according to the invention;

FIG. 18 is a diagrammatic elevational view partly in section of an application of the invention to the automatic taking up of play in an electric motor-speed reducer unit;

FIG. 19 is a simplified elevational view of an application of the screw-and-nut device according to the invention to the taking up of play in a hand brake;

Figure 1:
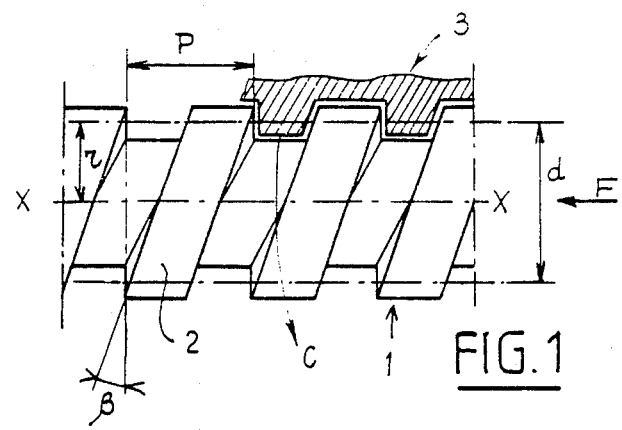
FIGS. 1 to 4 are diagrams recalling known notions relating to screw-and-nut systems provided in order to facilitate the understanding of the invention.

Shown in FIG. 1 is a screw 1 whose screwthread 2 is engaged in the corresponding tapping of a nut 3. The thread 2 is inclined to the perpendicular to the axis X—X of the screw 1 at a helix angle $\beta$, the thread 2 having a pitch p.

Figure 2:
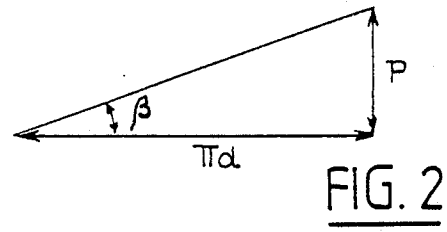

FIG. 2 shows the development of the thread 2 and the helix angle $\beta$ for which the tangent $\beta = p/\pi d$.

Figure 3:
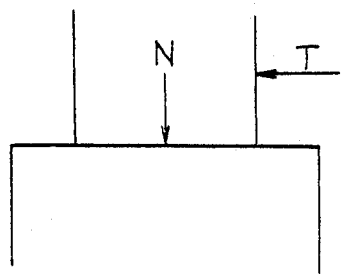
Figure 4:
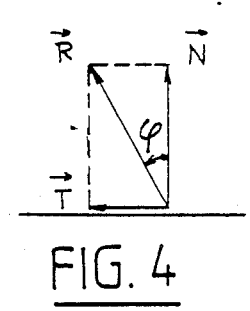

Further, the coefficient of friction f between two surfaces pertaining to different objects is defined by the ratio between the force T (FIGS. 3 and 4) required to cause two surfaces to slide with respect to each other and directed in the direction of displacement, and the force N which is the pressing force applying the two surfaces against each other. The angle $\phi$ of friction between the two surfaces is the angle between the resultant R of N and T (FIG. 4) and the force N.

The efficiency of the system comprising the screw 1 and nut 3 in which the screw is subjected to an axial force F (FIG. 1) is by definition the ratio of the power obtained at the output by the power furnished at the input. In this system, a force F is furnished on the axis of the screw 1 which results in a linear displacement of the latter and there is recovered a torque C on the nut 3. The tangential force exerted on the nut 3 being Ft, it can be shown that the efficiency is defined by the following expression:

$$\eta = \frac{\tan(\beta - \phi)}{\tan\beta}$$

Further, with r being the mean radius of the screw, the torque C is defined by the following relation:

$$c = Fr \tan(\beta - \phi)$$

and the tangential force is:

$$Fr = F \tan(\beta - \phi)$$

In taking the formula of the efficiency $\eta$, it is found that, when the helix angle $\beta$ is less than the friction angle $\phi$, the efficiency $\eta$ is negative or nil. In other words, when a thrust is exerted on the screw 1, the nut 3 does not rotate.

Figure 21:
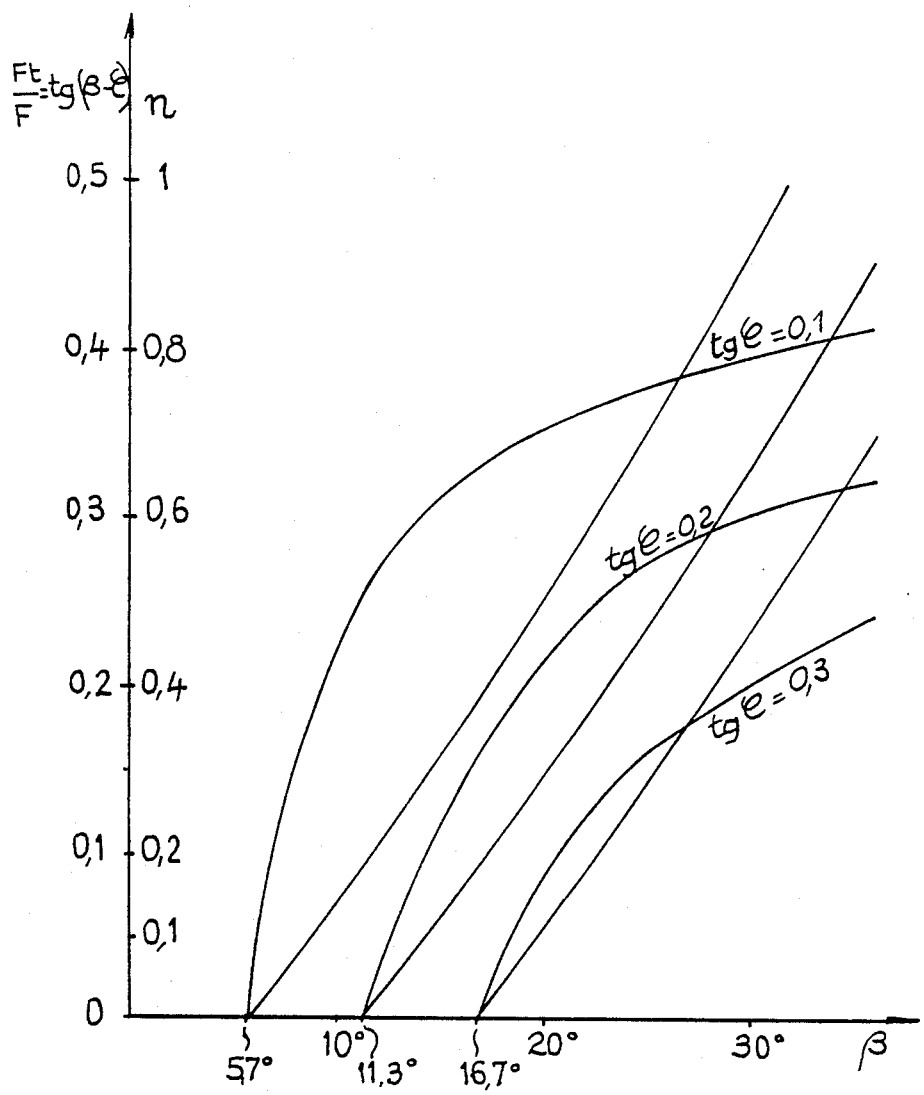
FIG. 21 is a graph giving the values of the efficiency of the screw-and-nut system in accordance with the helix and friction angles of the screw.

The graph of FIG. 21 illustrates the evolution of the ratio Fr/F, i.e. the efficiency $\eta$, as a function of helix angle $\beta$, plotted as abscissae, and of the friction angle $\phi$. The curves obtained may be used for the determination of the helix angle $\beta$, as a function of the coefficient of friction:

$$f = \tan \phi.$$

Lastly, the angle of pressure $\alpha$ is the angle of inclination of the flank of the thread 2 (surface on which occurs the contact between the screw 1 and the nut 3) relative to the perpendicular to the axis X—X of the screw 1.

It is shown that the efficiency $\eta$ depends on the angle of pressure $\alpha$ and is expressed by the formula:

$$\eta = \frac{\cos\alpha\tan\beta - \tan\phi}{\tan\beta(\cos\alpha + \tan\phi\tan\beta)}$$

When $\alpha = 0$, there is found the preceding expression of the efficiency $\eta = \tan(\beta - \phi)/\tan\beta$.

It is found that as the angle of pressure A increases, the efficiency n decreases.

Having made these explanatory references, there will now be described, with reference to FIG. 5, a first embodiment of the invention.

Generally, the invention prescribes that the helix angle $\beta$ and pressure angle $\phi$ are so chosen that, in a first direction, termed reversible S1, the screw 4 is able, under the effect of an axial thrust F exerted in this direction, effect a translation and a rotation in the nut and that, in a second direction S2 termed irreversible direction, opposed to the first direction, the screw 4 undergoing an axial thrust in this second direction S2, cannot effect a translation or rotation in the nut.

In the embodiment of FIG. 5, it is seen that the screwthread 5 has two flanks 5a and 5b whose pressure angles are very different: the pressure angle $\alpha 1$ of the flank 5a is very small (a few degrees) and may moreover be nil, while the pressure angle $\alpha 2$ of the second flank 5b, oriented in the irreversible direction S2, is large.

The result of this arrangement of the flanks 5a, 5b is the following: in the reversible direction S1, the bearing surface is that of the flank 5a, and the efficiency is expressed by:

$$\eta 1 = \frac{\tan(\beta - \phi)}{\tan\beta,} > 0$$

In the irreversible direction S2, the bearing surface is that of the flank 5b and the efficiency is:

$$\eta 2 = \frac{\cos\alpha\tan\beta - \tan\phi}{\tan\beta(\cos\alpha + \tan\beta\tan\phi)} < 0$$

The two foregoing conditions for the efficiency $\eta$ lead to the determination of a gap of values of the angle $\beta$, this gap depending on the value of $\alpha$. The greater $\alpha$ the larger is this gap. The upper limit value of $\alpha$ is the value of the wedge angle, and the lower limit value of $\alpha$ is the value in respect of which there is no helix angle $\beta$ verifying the two foregoing conditions.

As a numerical example, if one starts with a coefficient of friction between the surfaces of the flanks of the screw and nut, so that tan $\phi=0.3$, i.e. $\phi=16.7°$, one must have $\eta 1>0$ to obtain the reversibility, from which the condition $\beta>16.7°$ is deduced.

A coefficient of friction associated with the angle of friction $\beta=16.7°$ is high and therefore corresponds to a large friction between the surfaces. Therefore, if for such a coefficient of friction, the reversibility is obtained in the considered direction, this reversibility will in any case be conserved if the state of the surfaces in contact deteriorate in the course of operation of the device, so long as the coefficient of friction tan $\phi$ is less than 0.3.

In the irreversible direction, surfaces are chosen having a friction which is as small as possible, the coefficient of friction depending on several factors, in particular the materials employed, the surface states, the lubrication, etc . . . . For example, there may be chosen a coefficient of friction corresponding to an angle of friction $\phi$ so that tan $\phi=0.1$.

To obtain the irreversibility in this direction, the condition $\eta 2<0$ must be satisfied, from which the following conditions are deduced from the preceding relation:

$$\alpha = \text{Arc cos} \frac{0.1}{\tan\beta}$$

$$\beta < \text{Arc tan} \frac{0.1}{\cos\alpha}$$

The minimum angle of pressure for ensuring the irreversibility in the direction S2 and the reversibility in the other direction S1 is obtained for $\beta=16.7°$, from which is deduced:

$$\alpha > 70.53°$$

Thus, the irreversibility in the direction S2 being obtained from the surfaces whose coefficient of friction is as small as possible, it is ensured that this irreversibility will in any case be maintained during the operation of the device if the coefficient of friction becomes deteriorated.

Figure 20:
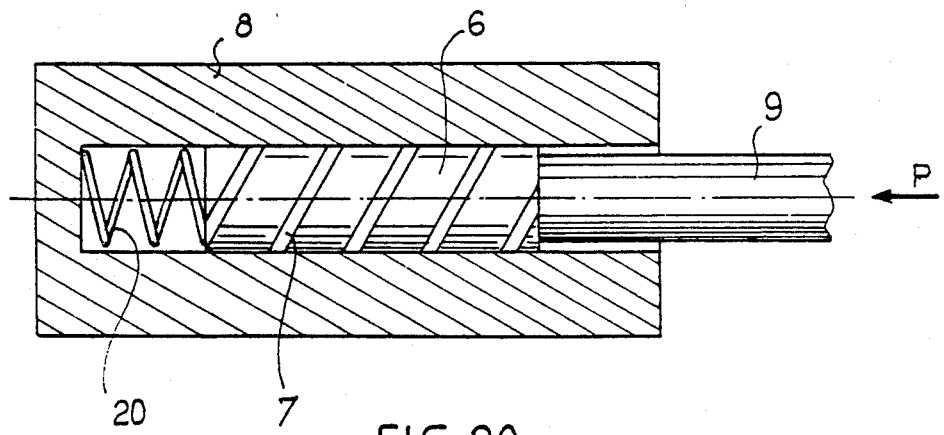
FIG. 20 is a longitudinal elevational view of a screw-and-nut system associated with a push-member and an elastically yieldable element according to the principle of the invention.

FIG. 20 shows the principle of the screw-nut device according to the invention subjected to an axial force alternating in both directions, tolerating the screwing in one of the two directions and preventing it in the other. In this device, the screw 6 provided with a screwthread 7 satisfying the conditions explained hereinbefore, is placed in a nut body 8 and urged in the irreversible direction by a thrust member 9 exerting on the screw 6 an axial force P and in the reversible opposed direction by a coil spring 20 bearing against the bottom of the nut 8.

Provided between the screw 7 and the nut 8—as in all the embodiments of the screw-nut device according to the invention—are two operational clearances (not seen in FIG. 20):

a first clearance which may be termed "minimum operational clearance", corresponding to the axial distance through which the screw must be moved so that its thread moves from a bearing against the nut in one direction to the bearing against the nut in the other direction;

a second clearance, obtained in the same way as the first clearance, which is necessary for permitting the recovery of the elastic deformation of the system on which the screw-nut device according to the invention is employed.

This second clearance is therefore, as the first, obtained for example by decreasing the size of the thread of the screw or by increasing the gap between two threads of the nut. The elastic deformations of the system are for example those occurring by thermal expansion as in an electric motor-speed reducer or by expansion of certain parts, in particular the cable in a cable control in a closed loop.

As a clearance or play appears, it is taken up by the thrust exerted by the spring 20 on the screw 7 which therefore progressively moves in this reversible direction, while this screw cannot move in the opposite irreversible direction under the effect of the thrust P of the thrust member 9.

The upper limit values of the angles $\alpha$ and $\beta$ may be determined. By way of a non-limiting numerical example and starting with the same values as above for tan $\gamma$ (0.1 and 0.3):

The limit value of the angle of pressure $\alpha$ is obtained by taking the complement of the angle of friction 16.7° i.e. 73.3°, which corresponds to the angle beyond which one enters the field of wedging cones, for tan $\phi=0.3$ ($\phi=16.7°$).

$$\alpha \text{ limit}=73.3°$$

$\alpha$ will therefore be in this indicative example, between 70.53° and 73.3°.

There may be deduced from the foregoing upper limit value of $\alpha$, the corresponding limit value of the helix angle $\beta$, i.e. the upper limit of $\beta$, so that the irreversibility condition will be ensured:

$$\beta < 22.05°$$

$\beta$ being therefore between this maximum value and 16.7°.

In the first embodiment of the invention described hereinbefore, each flank of the thread of the screw has its own pressure angle, the helix angle $\beta$ being constant and greater than the friction angle $\phi$.

But the invention may also be employed by varying the helix angle $\beta$, the pitch p of the screw remaining constant as its pressure angle $\alpha$. Indeed, the tangent of the angle $\beta$ being tan $\beta=p/\pi d$, it is found that, when the diameter d increases tan $\beta$ decreases, as the angle $\beta$: thus, in FIG. 10, it can be seen that, for a given pitch p and two different screw diameters d1 and d2, the corresponding helix angles $\beta 1$ and $\beta 2$ are different with here $\beta 1$ greater than $\beta 2$. Further, according to the graph of FIG. 21 where the relation tan $(\beta-\phi)/\tan \beta$, it is found that the more $\beta$ decreases, the more the efficiency $\eta$ decreases, and becomes nil when $\beta=\phi$.

By constructing a screw having two different contact diameters (mean diameters) d1 and d2, there are therefore obtained two helix angles $\beta 1$ and $\beta 2$, since the pitch p is fixed. It is then possible to choose the diameters d1 and d2 in such manner that three corresponds to the angle $\beta 1$ a reversible direction and to the angle $\beta 2$ an irreversible direction. Further, the friction angle C must be between $\beta 1$ and $\beta 2$, namely:

$$\beta 1 > \phi > \beta 2$$

The invention provides two embodiments of this principle:

In the embodiment of FIGS. 6 and 7, the screw 10 has a thread 11 whose pressure angles α are nil, its flanks 12, 16 being indeed perpendicular to the axis of the screw 10. The flank 12 is in the shape of a step of stairs so as to provide a step surface 13 between the surface of the core 14 of the screw 10 and the crest 15 of the thread 11, while the second flank 16 is rectilinear. The step surface 13 thus connects a lower flank 12a to an upper flank 12b adjacent to the crest 15. Corresponding to the flank 12 are two different diameters d1 and d2 of the respective parts 12a, 12b which are so chosen as to obtain for the flank 12 a reversible direction by a thrust on its part 12a between the step surface 13 and the surface of the core 14 against the nut 12, while an opposite thrust P2 of the flank 16 on the nut 17 corresponds to the irreversible direction of the screw 10 (FIG. 7). The tapping 80 receiving the thread 11 is defined, adjacent to the flank 12 by a rectilinear wall and adjacent to the flank 16 by a wall which is also rectilinear but has a step 81 widening the cavity for the thread at the level of the upper part 12b of the flank 12.

The second embodiment of the principle explained hereinbefore is illustrated in FIGS. 8 and 9, in which it can be seen that the thread of the screw 22 is constituted in axial section by two contiguous teeth 18, 19 separated by a gap 21 and of unequal heights. Thus the height of the tooth 18, and corresponding mean diameter d3 of the screw 22 are less than the height and less than the corresponding mean diameter d4 of the tooth 19, the diameter d of the screw 22 remaining constant from one end to the other of the latter and, as before, the pressure angles of the teeth 18, 19 are nil. Machined in the nut 23 is a tapping 82 receiving the two threads of the teeth 18, 19 with an axial clearance (jl) corresponding to the minimum operational clearance and the clearance taking up elastic deformations, as explained before.

As viewed in axial section, two consecutive cavities of the tapping 82 are separated by a projecting thread 83 in which is formed, adjacent to the tooth 19, a step 84 defining on the thread 83 a face 85 for the bearing of the tooth 19 when the tooth 19 is actuated in the reversible direction (FIG. 9). A mean diameter d4 of the screw 22 corresponds to this bearing on the face 85.

The reversible direction of operation is that in which the screw 22 is subjected to a thrust applying the teeth 18 against the radial faces 86 of the tapping 82 opposed to the faces 85 (FIG. 8).

In the modification of FIGS. 8A-9A-8B, the screw 90 is constituted by two parts having different mean diameters d1 and d2 with d2>d1, the pitch P of the thread being constant. The part of the thread corresponding to the diameter d2 therefore has a helix angle β2 less than the helix angle β1 of the part having the diameter d1.

The teeth 91 having a mean diameter d1 are received in a tapping 92 of the nut 93, and the teeth 94 having a mean diameter d2 are received in a complementary tapping 95, the two end teeth 91 and 94 being engaged in a cavity 96 suitably machined in the nut 93. The tappings 92, 95, 96 are so dimensioned as to provide a minimum clearance for operation and taking up elastic deformations as explained before.

Figure 8A:
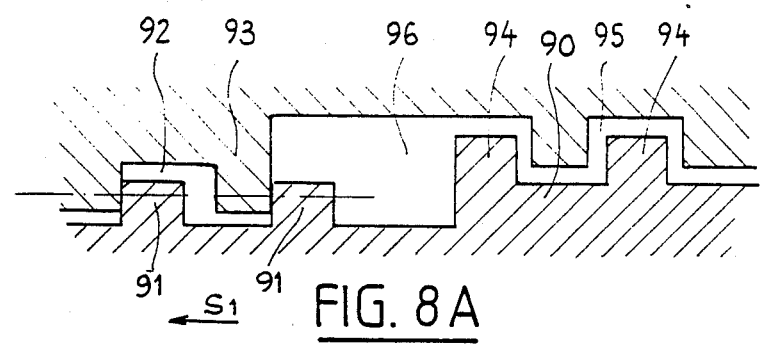
FIGS. 8A and 9A are similar to FIGS. 8 and 9 of a modification of the embodiment illustrated in the last-mentioned Figures.
Figure 9A:
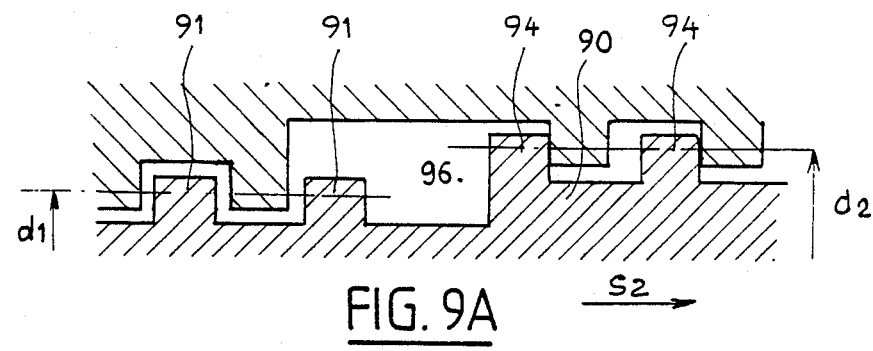
Figure 8B:
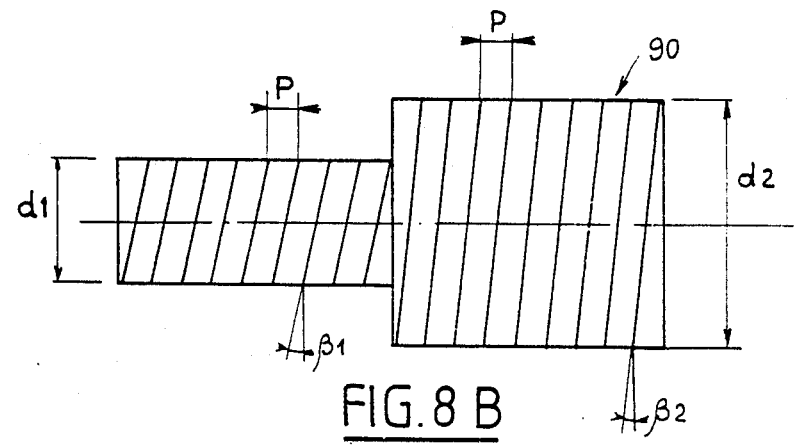
FIG. 8B is a longitudinal elevational view of the screw which is part of the modification of FIGS. 8A and 9A.

In FIG. 8A, the teeth 91 bear against the nut 93 when the screw 90 is subjected to an axial thrust S1 in the reversible direction, and in FIG. 9A it is the teeth 94 which bear against the nut when the screw is urged in the opposite irreversible direction S2.

SIMULTANEOUS VARIATION OF THE PRESSURE ANGLE β AND THE HELIX ANGLE α

In other embodiments described hereinafter with reference to FIGS. 11 to 14, the invention provides a combination of the preceding constructions for producing a screw having pressure and helix angles which are different, depending on the direction of actuation, the pitch p remaining the same in both directions of actuation, namely reversible and irreversible. Such a combination permits an increase in the performances of the screw-nut system while reducing its overall size.

In the embodiment illustrated in FIGS. 11 and 12, a flank 24 of the thread 25 of the screw 26 is shaped as a stair step and presents a step surface 27 between the crest 28 of the thread 25 and the surface 29 of the core of the screw 26, the pressure angles of the rectilinear portions of the flank 24 located on each side of the step surface 27 being nil. Complementary to this, the second flank 31 of the screw 26 had a high pressure angle α. Thus, there is associated with the flank 24 a helix angle β1 corresponding to the diameter d5 and there is associated with the flank 31 a helix angle corresponding to the diameter d6.

The tapping of the nut 32 has a profile comprising a wall perpendicular to the axis of the screw 26 and adapted to come into contact with the portion of the flank 24 between the surface 29 and the step surface 27, and a wall 86 confronting the flank 31 with the same inclination as the latter.

When an axial thrust exerted on the screw 26 applies the flank 31 against the surface 86 (FIG. 12), the actuation of the screw 26 becomes irreversible in this direction, this contact locking it against rotation and in translation. In the opposite direction (FIG. 11), a thrust exerted on the screw 26 applies the lower portion of the flank 24 against the wall of the nut and the screw 26 effects a translation and a rotation (reversible direction).

In the embodiment of FIGS. 13 and 14, the thread is constituted in an axial section by two teeth 33, 34 of unequal height, the height of the tooth 34 being greater than that of the tooth 33, and the diameter of the screw being constant. The flanks of the tooth 33 have zero or practically zero pressure angles, as does the flank 35 of the tooth 34 confronting the tooth 33. On the other hand, the second flank 36 is inclined to the perpendicular to the axis of the screw at a high pressure angle (about 60 degrees in the illustrated embodiment).

The associated nut comprises a tapping 37 receiving the two teeth 33, 34, with sufficient clearance, this tapping 37 being defined adjacent to the tooth 33 by a radial wall 38 orthogonal to the axis of the screw and, adjacent to the inclined surface 36, by a wall 39 having the same inclination. An annular shoulder 41 defined by the walls 38 and 39 enters with clearance between two consecutive teeth 34 and 33, and the latter have respectively mean diameters d8 and d7 bearing against the associated walls.

In the reversible direction of the device (FIG. 13), the teeth 33 bear against the walls 38 and, in the irreversible direction, the teeth 34 bear by their surfaces 36 against the walls 39 (FIG. 14).

When the screw is subjected to an axial thrust from the right toward the left, as viewed in FIG. 13, the teeth 33 are applied against the confronting surfaces of the nut (surfaces perpendicular to the axis of the screw) in the reversible direction of actuation of the screw. When the axial thrust undergone by the screw is in the opposite direction to the preceding thrust (FIG. 14), the flank 36 comes to bear against the inclined surfaces 39 and the screw is then locked against translation and rotation, this direction of actuation of the screw being therefore irreversible.

$\beta 1$ and $\beta 2$ being respectively the helix angles of the teeth 33 and the teeth 34, the efficiency in the reversible direction is denoted by the expression:

$$\eta 1 = \frac{\tan(\beta 1 - \phi)}{\tan \beta 1} > 0$$

and the efficiency in the irreversible direciton is denoted by:

$$\eta 2 = \frac{\cos\alpha \tan\beta 2 - \tan\phi}{\tan\beta 2(\cos\alpha + \tan\beta 2 \tan\phi)} < 0$$

Figure 13A:
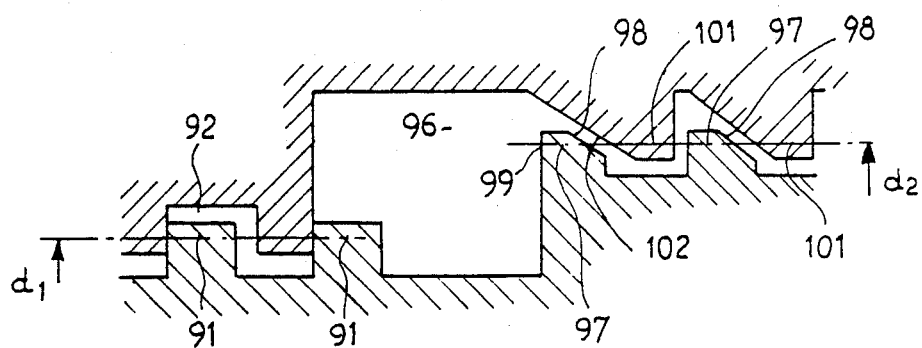
FIG. 13A shows a modification of the embodiment of FIG. 13.

The modification of FIG. 13A differs from that of FIGS. 8A-9A in that the teeth 94 are replaced by teeth 97 whose surfaces 98 facing in the ocpposite direction to the teeth 91 have a large pressure angle, the other surfaces 99 of the teeth 97 conserving a zero pressure angle.

Correspondingly, the nut comprises, in facing relation to the thread constituted by the teeth 97, threads 101 entering with clearance between two consecutive teeth 97 and having walls 102 which are parallel to the inclined surfaces 98.

In the embodiments described hereinbefore, it has been assumed that the coefficient of friction of the surfaces of the screw and nut may be determined with sufficient precision. When this is not the case, the described solutions are no longer applicable. Indeed, The less the coefficient of friction is known, the smaller the range of possible values of these angles.

In order to solve this difficulty, the invention teaches in such cases the provision of a small coefficient of friction on the flank of the thread which is operative in the reversible direction and, on the other hand, a high coefficient of friction on the flank of the thread which is operative in the irreversible direction.

Thus, FIG. 15 shows an embodiment of the invention, in which the screw 45, disposed in a nut 46, biased on one side by a spring 47 in the reversible direction of actuation, and on the opposite side by a thrust member 48 in the irreversible direction, comprises threads 49 having one flank having a large pressure angle and on which are machined ribs 51 of a knurling. The screw 45 is made from a material which is harder than that of the nut 36, so that the ribs 51 enter into the corresponding flank of the tapping of the nut and there is consequently an interference of material between the screw 45 and the nut 46. The latter may also carry ribs compatible with the ribs 51 of the screw 45.

By way of example, the screw 45 may be of steel or possibly of a thermosetting material, while the nut 46 is made from a polyamide with a glass fibre filler or of acetal.

FIGS. 16 to 19 illustrate several possible applications of the screw-nut system according to the invention, in the automatic taking up of play in various mechanisms.

Figure 16:
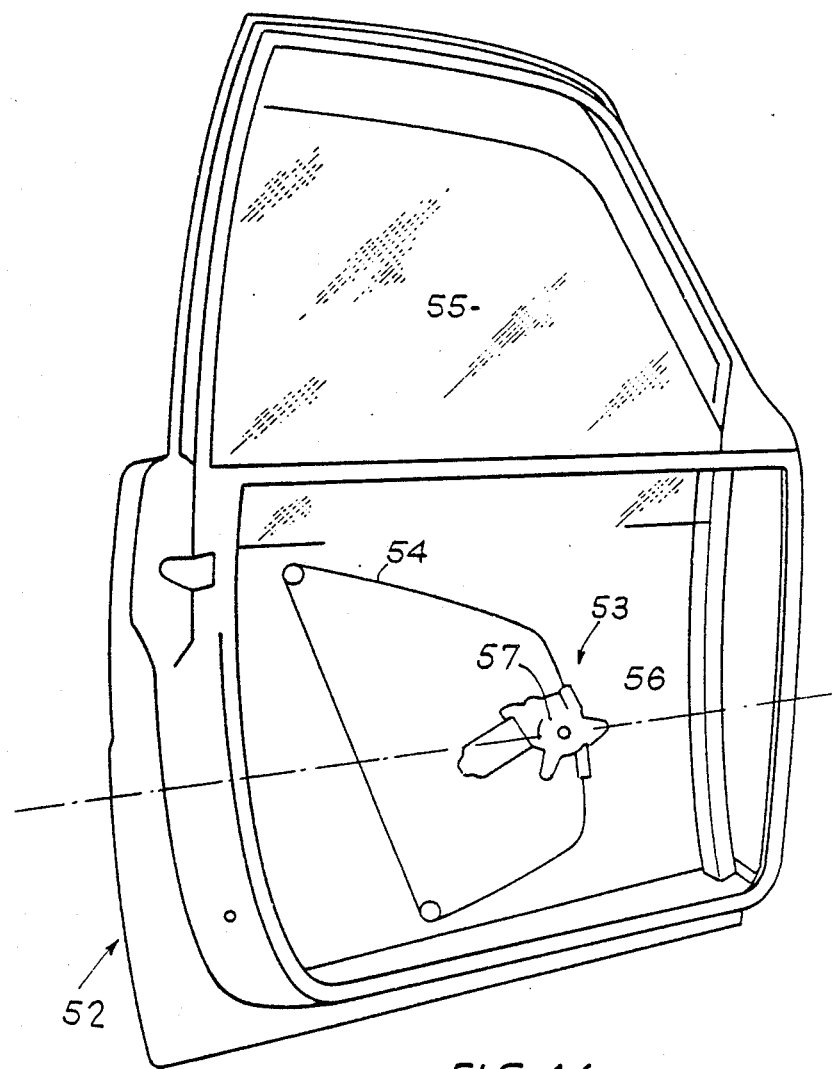
FIG. 16 is a perspective view of a motor vehicle door whose inner panel has been removed and which is provided with a window raising system employing a cable capable of being provided with a screw-and-nut device according to the invention for taking up the operational play of the cable.

(1) There can be seen in FIG. 16 a door 52 of a motor vehicle inside of which is mounted a window raising device 53 employing a cable 54 in a closed loop, for example a conventional BOWDEN cable. The window glass 55 guided in a slideway is driven by the cable 54 which passes in a sheath 56 up to a drum 57 around which it is wound. This drum 57 may be actuated either by a crank (manual raising of the glass) or by a motor-speed reducer unit (electric raising of the glass).

Figure 17:
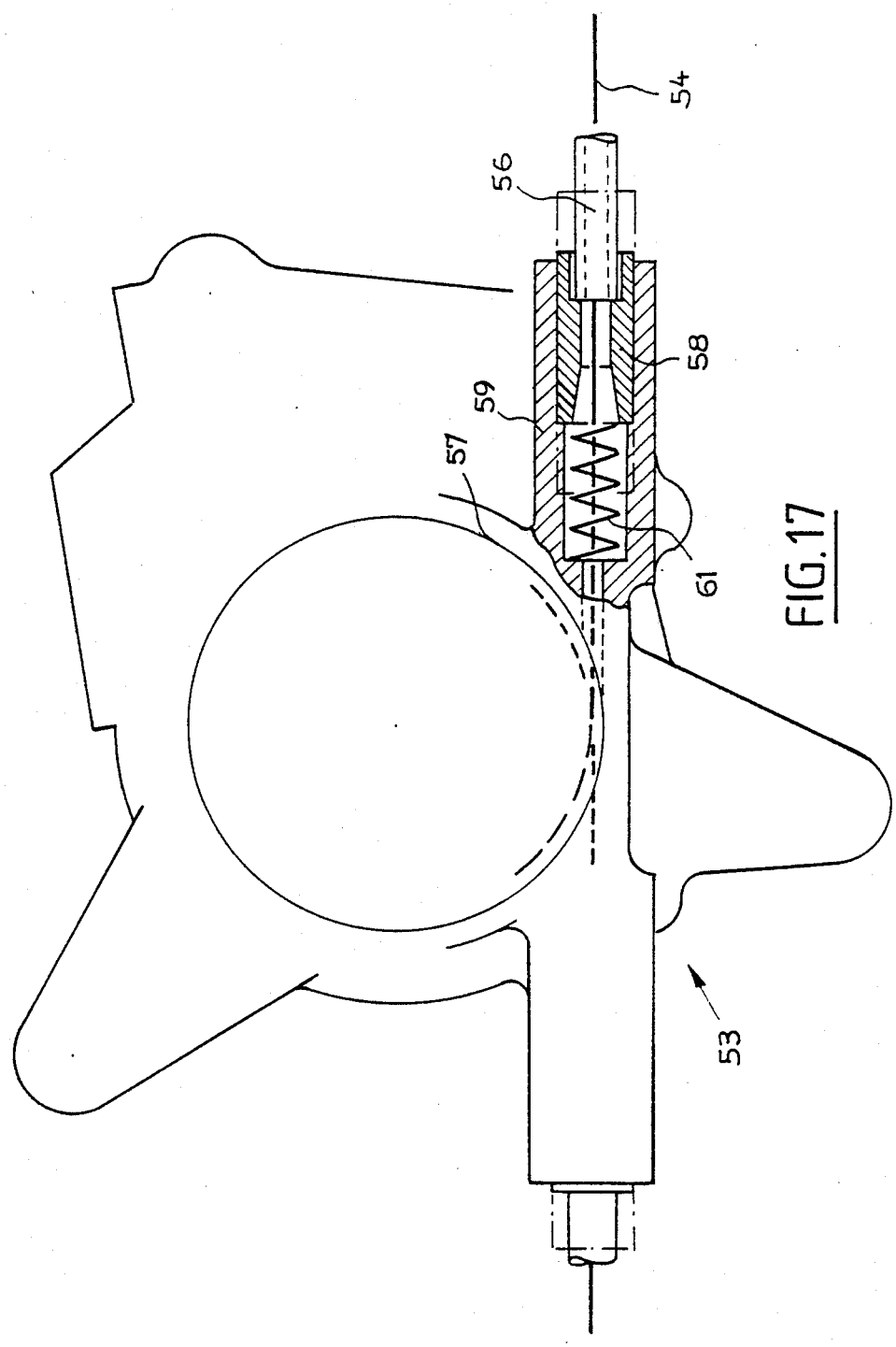
FIG. 17 is a simplified elevational view partly in section of a window raising system employing a cable provided with a screw-and-nut device according to the invention which may be mounted in the vehicle door shown in FIG. 16.

The screw-nut device according to the invention applied to this window raiser 53 is represented in FIG. 17 which shows that the sheath 56 is engaged by its end in a shaped screw 58 in accordance with one of the embodiments described hereinbefore, this sheath 56 performing the function for the screw 58 of a thrust member. The screw 58 is disposed in a housing-nut 59 whose tapping has a profile conjugate to the screwthread of the screw 58, in accordance with one of the embodiments described hereinbefore. The screw 58 is axially biased by a spring 61 which bears against the end of the cavity of the housing 59 in the axial direction opposed to that of the thrust exerted by the sheath 56. The clearance appearing progressively on the cable 54 in the course of operation of the window glass raiser 53, is thus automatically taken up by the displacement of the screw 58 in the reversible direction, and therefore toward the right, as viewed in FIG. 17, under the thrust exerted by the spring 61, each time that the axial force exerted by the thrust sheath 56 disappears or is sufficiently reduced (generally in all the applications of the invention). Inversely, the thrust exerted by the sheath 56 cannot urge the screw 58 rearwardly, even if this thrust is much greater than that of the spring 61.

(2) In the application of FIG. 18, the screw-nut device is mounted in an electric motor-speed reducer unit 62 of utility in the control of various mechanisms, for example accessories of motor vehicles. This motor-speed reducer unit 62 comprises a shaft 63 whose ends 64 (only one end is visible in FIG. 18), are provided with abutments 65 which are applied against the planar surfaces 66a of abutments 66 formed by the ends of the screw 67, according to the invention. Each screw 67 is disposed in a housing-nut 68 also shaped in a conjugate manner to the threads of the screw 67. A spring 69 placed in bearing relation to the end of the housing-nut 68 extends into the screw 67 on which it exerts in the reversible direction an axial force opposed to the opposite force exerted by the abutment 65. Consequently, the axial clearance or play which may occur in the course of operation between the abutments 65 and 66 is automatically taken up by the progression of the screw 67 under the action of the springs 69, so that the shaft 63 is held in contact with the abutments 66 throughout the life of the motor-speed reducer unit 62.

(3) In the embodiment of FIG. 19, the screw-nut system according to the invention is applied to the automatic taking up of the clearance of the cable 70 of a hand brake 71, for example of a bicycle or motor cycle, or of a clutch control. This brake comprises a manual lever 72 cooperating with a rack 73 articulated at 74 on a housing-nut 75 containing a screw 76 according to the invention and biased in the reversible direction for automatically taking up the clearance of the cable 70 by a spring 77 disposed in the housing 75 and coaxial with the cable 70. The lever 72 extends through a cap 78 carrying a pivot pin 79 on which the lever 72 is pivotally mounted (arrows A and B).

The applications of the nut system according to the invention illustrated in FIGS. 16 to 19 are only examples among the very many possible applications of the invention.

There will be given hereinafter non-limiting numerical examples of the carrying out of the invention:

A

KNOWN COEFFICIENT OF FRICTION

1. Variation of the angle $\alpha$ with $\beta > \phi$

Let it be assumed that $\tan \phi = 0.2$ whence $\phi = 11.31°$
Let it be assumed that $\beta = 22.04°$, mean diameter of the screw $d = 10$ mm and $p = 12.7$ mm.
Conditions of operation:
Reversible direction:

$$\eta_1 = \frac{\tan(\beta - \phi)}{\tan\beta} = 0.468$$

Irreversible direction:
With $\alpha = 74°$ $$\eta_2 = \frac{\cos\alpha\tan\beta - \tan\phi}{\tan\beta\cos\alpha + \tan\beta\tan\phi}$$

that is $$\eta_2 = \frac{\cos(74°)\tan(22.04°) - \tan(11.25°)}{\tan(22.04°)[\cos(74°) - \tan(2.04)\tan(11.35°)]} < 0$$

The absolute value of $\eta$ (efficiency) has not importance, only the fact that the efficiency is negative is important.

It is therefore found that by a simple introduction of an angle $\alpha$ of 74°, an efficiency of 0.47 changes to a negative efficiency.

2. Variation of the angle $\beta$

Let is be assumed that $\tan \phi = 0.2$ and $p = 6$ mm
Conditions of operation:
Reversible direction:

$$\eta_1 > 0 \text{ i.e. } \frac{\tan(\beta_1 - \phi)}{\tan\beta_1} > 0$$

in other words:

$$\beta_1 > \phi = \beta_1 > \tan\phi$$

$$= \frac{p}{\pi d_1} > \tan\phi$$

$$= d_1 < \frac{p}{\pi\tan\phi}$$

namely with $\tan \phi = 0.2$ and $p = 12.7$ mm $d_1 < 9.55$ mm
Irreversible direction:
$\eta_2 < 0$, namely:

$$\frac{\tan(\beta_2 - \phi)}{\tan\beta_2} < 0$$

The same reasoning as for the reversible direction gives:

$$d_2 > \frac{p}{\pi\tan\phi}$$

If the following are chosen:

$d_1 = 7$ mm, $\eta_1 = 0.25$ (reversible direction) and
$d_2 = 10$ mm, $\eta_2 < 0$ (irreversible direction)

Thus it can be seen that by a variation of 30% of the diameter $d$, there is a change from a negative efficiency to an efficiency of 0.25.

3. Simultaneous variation of the angles $\alpha$ and $\beta$
Conditions of operation:
Let is be assumed that $p = 12.7$ mm and $\tan \phi = 0.2$
Reversible direction:
As in the preceding paragraph 2, there is obtained:

$$d_1 < \frac{p}{\pi\tan\phi} = \frac{12.7}{\pi \times 0.2} = 20.21 \text{ mm}$$

Reversible direction:

$$\eta_2 = \frac{\cos\alpha\tan\beta - \tan\phi}{\tan\beta(\cos\alpha + \tan\beta\tan\phi)} < 0$$

whence: $\cos \alpha \tan \beta - \tan \phi < 0$ and $\cos \alpha \tan \beta < 0.2$ with $\alpha = 65°$ and $d_2 = 10$ mm, namely $\beta = 22°$ there is obtained: $\cos \alpha \tan \beta = 0.171$ whence: $\eta_2 < 0$, i.e. the desired result.

What is claimed is:

1. A device comprising a screw and a nut, a thrust member associated with the screw and capable of exerting on the screw an axial thrust capable of causing the displacement of the screw in the nut, said screw having a screw thread consisting of two flanks inclined to a perpendicular to the axis of the screw defining a pressure angle $\alpha_1$ of the first blank and a pressure angle $\alpha_2$ of the second flank measured from the perpendicular to said axis $\alpha_1$ and $\alpha_2$ being different, and said screw thread further having a given helix angle $\beta$, the pressure angles $\alpha_1$ and $\alpha_2$ and helix angle $\beta$ being so chosen that in a first direction termed the reversible direction, the screw is capable, under an axial thrust exerted in said first direction by an elastic element, of effecting a helical movement in said nut each time the force exerted by the thrust member disappears or is sufficiently small, and that, in a second direction termed the irreversible direction opposed to the first direction, the screw when urged by means of the thrust member by a force very much higher than the force exerted by said elastic element in said second direction, can effect neither a translation nor a rotation of said nut, the thread of the screw having in section two flanks inclined to a perpendicular to the axis of the screw, and the pressure angles $\alpha_1$, $\alpha_2$ of the two flanks are different.

2. A device according to claim 1, wherein one pressure angle, $\alpha_1$, is between zero and a low value, and the other pressure angle $\alpha_2$, is a high value.

3. A device comprising a screw and a nut, a thrust member associated with the screw and capable of exerting on the screw an axial thrust capable of causing displacement of the screw in the nut, said screw having a screw thread having two different helix angles $\beta_1$ and $\beta_2$, a given pressure angle $\alpha$ which is substantially zero, and a pitch which is constant, said screw having two different mean diameters and said screw and nut threads having surfaces which are in mutual contact and have a friction angle $\phi$ formed between the force required for causing the two surfaces to slide on each other, the two mean diameters of said screw being so chosen that there corresponds to the first helix angle $\beta_1$ the reversible direction and there corresponds to the second helix angle $\beta_2$ the irreversible direction with the condition $$\beta_1 > \phi > \beta_2,$$

said screw further having a core surface and the screw thread has a crest and one of the flanks of the thread of the screw is shaped as a stair step so as to define a step surface between the core surface of the screw and the crest of the thread defining two successive flank portions while the other flank of the thread is rectilinear, the different mean diameters thus corresponding to the two flank portions being chosen in such manner as to obtain a reversible direction by urging the flank portion of the smallest diameter against the nut, and an irreversible direction by urging against the nut the flank opposed to the step surface.

4. A device according to claim 3, in which the screw pitch is the same in both directions of operation of the screw, the flank of the thread opposed to the step surface having a large pressure angle.

5. A device comprising a screw and a nut, a thrust member associated with the screw and capable of exerting on the screw an axial thrust capable of causing the displacement of the screw in the nut, said screw having a screw thread having a given helix angle $\beta$ and a given pressure angle $\alpha$, the helix angle $\beta$ and the pressure angle $\alpha$ being so chosen that, in a first direction termed the reversible direction, the screw is capable, under an axial thrust exerted in said first direction by an elastic element, of effecting a helical movement in the nut each time the force exerted by the thrust member disappears or is sufficiently small, and that in a second direction termed the irreversible direction opposed to the first direction, the screw, when urged by means of the thrust member by a force very much higher than the force exerted by the elastic element in said second direction, can effect neither a translation nor a rotation in said nut, said screw having core and the thread of the screw is constituted by two distinct teeth having pressure angles which are substantially zero, but unequal heights above the core of the screw, so that the tooth of greater height has a helix angle less than that of the other tooth, and the tapping of the nut has optionally a recess in facing relation to the highest tooth, so as to increase the mean diameter of the bearing of the tooth against the nut in the irreversible direction of operation.

6. A device comprising a screw and a nut, a thrust member associated with the screw and capable of exerting on the screw an axial thrust capable of causing a displacement of the screw in the nut, said screw having a screw thread having a given helix angle $\beta$ and a given pressure angle $\alpha$, the helix angle $\beta$ and the pressure angle $\alpha$ being so chosen that, in a first direction termed the reversible direction, the screw is capable, under an axial thrust exerted in said first direction by an elastic element, of effecting a helical movement in the nut each time the force exerted by the thrust member disappears or is sufficiently small, and that, in a second direction termed the irreversible direction opposed to the first direction, the screw, when urged by means of the thrust member by a force very much higher than the force exerted by the elastic element in said second direction, can effect neither a translation nor a rotation in the nut, said screw having a core surface and the thread of the screw is constituted in axial section of the screw by two distinct teeth of unequal heights above the core surface, one of the teeth having pressure angles which are substantially zero while the highest tooth has adjacent to the other tooth of lesser height a surface having a zero pressure angle and on the opposite side of the highest tooth a second surface having a large pressure angle, the second surface being capable of coming into contact with a corresponding inclined surface of the tapping of the nut in the irreversible direction of operation of the device.

7. A device comprising a screw and a nut, a thrust member associated with the screw and capable of exerting on the screw an axial thrust capable of causing a displacement of the screw in the nut, said screw having a screw thread having a given helix angle $\beta$ and a given pressure angle $\alpha$, the helix angle $\beta$ and the pressure angle $\alpha$ being so chosen that, in a first direction termed the reversible direction, the screw is capable, under an axial thrust exerted in said first direction by an elastic element, of effecting a helical movement in the nut each time the force exerted by the thrust member disappears or is sufficiently small, and that, in a second direction termed the irreversible direction opposed to the first direction, the screw, when urged by means of the thrust member by a force very much higher than the force exerted by the elastic element in said second direction can effect neither a translation nor a rotation in the nut, the flank of the thread operating in the reversible direction of advance of the screw having a small coefficient of friction, while the flank of the thread operating in the irreversible direction having a high coefficient of friction, said flank having a high coefficient of friction carrying ribs or knurling machined on a hard material constituting the screw, while the nut is made from a less hard material.

8. A structure comprising in combination a device comprising a screw and a nut, a thrust member associated with the screw and capable of exerting on the screw an axial thrust capable of causing the displacement of the screw in the nut, the screw having a screw thread having a given helix angle $\beta$ and given pressure angle $\alpha$, the helix angle $\beta$ and the pressure angle $\alpha$ being so chosen that, in a first direction termed reversible direction, the screw is capable, under an axial thrust exerted in said first direction by an elastic element, of effecting a helical movement in the nut each time the force exerted by the thrust member disappears or is sufficiently small, and that, in a second direction termed irreversible direction opposed to the first direction, the screw, when urged by means of the thrust member by a force very much higher than the force exerted by the elastic element in said second direction, can effect neither a translation nor a rotation in the nut; a window raiser including a cable in a closed loop, a sheath surrounding the cable, a drum around which drum the cable is wound, said sheath constituting said thrust member, said nut constituting a housing, a spring contained in said housing constituting said elastic element which axially biases the screw with a force which is opposed to the thrust of the sheath and urges the screw in the irreversible direction while the spring urges the screw in the reversible direction so as to take up clearance due to progressive stretching of said cable.

9. A structure comprising in combination a device comprising a screw and a nut, a thrust member associated with the screw and capable of exerting on the screw an axial thrust capable of causing the displacement of the screw in the nut, the screw having a screw thread having a given helix angle $\beta$ and given pressure angle $\alpha$, the helix angle $\beta$ and the pressure angle $\alpha$ being so chosen that, in a first direction termed reversible direction, the screw is capable, under an axial thrust exerted in said first direction by an elastic element, of effecting a helical movement in the nut each time the force exerted by the thrust member disappears or is sufficiently small, and that, in a second direction termed irreversible direction opposed to the first direction, the screw, when urged by means of the thrust member by a force very much higher than the force exerted by the elastic element in said second direction, can effect neither a translation nor a rotation in the nut; an electric motor-speed reducer unit comprising a shaft, two abutments abutting opposite ends of said shaft, said unit constituting a housing in which said screw is disposed, a spring disposed inside the housing and constituting said elastic element, said screw defining at an end of the screw one of said abutments for retaining the shaft, said thrust being exerted in the reversible direction so as to maintain the shaft bearing against said abutment defined by an end of the screw.

10. A structure comprising in combination a device comprising a screw and a nut, a thrust member associated with the screw and capable of exerting on the screw an axial thrust capable of causing the displacement of the screw in the nut, the screw having a screw thread having a given helix angle $\beta$ and given pressure angle $\alpha$, the helix angle $\beta$ and the pressure angle $\alpha$ being so chosen that, in a first direction termed reversible direction, the screw is capable, under an axial thrust exerted in said first direction by an elastic element, of effecting a helical movement in the nut each time the force exerted by the thrust member disappears or is sufficiently small, and that, in a second direction termed irreversible direction opposed to the first direction, the screw, when urged by means of the thrust member by a force very much higher than the force exerted by the elastic element in said second direction, can effect neither a translation nor a rotation in the nut; a hand-brake comprising a brake-applying member and a brake cable, said device being interposed between the cable and the brake-applying member, whereby the device is capable of taking up cable stretch.

11. A structure comprising in combination a device comprising a screw and a nut, a thrust member associated with the screw and capable of exerting on the screw an axial thrust capable of causing the displacement of the screw in the nut, the screw having a screw thread having a given helix angle $\beta$ and given pressure angle $\alpha$, the helix angle $\beta$ and the pressure angle $\alpha$ being so chosen that, in a first direction termed reversible direction, the screw is capable, under an axial thrust exerted in said first direction by an elastic element, of effecting a helical movement in the nut each time the force exerted by the thrust member disappears or is sufficiently small, and that, in a second direction termed irreversible direction opposed to the first direction, the screw, when urged by means of the thrust member by a force very much higher than the force exerted by the elastic element in said second direction, can effect neither a translation nor a rotation in the nut; a clutch control system comprising a housing and a movable clutch-shifting member, said device being interposed between and connected to the clutch-shifting member and the housing whereby the device is capable of taking up clutch wear.

* * * * *